June 28, 1955    J. R. CAMPBELL    2,712,055
ELECTRIC HEATING SYSTEM
Filed May 5, 1952    3 Sheets-Sheet 2

INVENTOR.
James R. Campbell.
BY
ATTORNEYS.

INVENTOR.
James R. Campbell.

ATTORNEYS.

United States Patent Office 2,712,055
Patented June 28, 1955

---

2,712,055

ELECTRIC HEATING SYSTEM

James R. Campbell, Laguna Beach, Calif.

Application May 5, 1952, Serial No. 286,189

15 Claims. (Cl. 219—44)

This invention relates to heating systems in which a body is heated by electric heating means.

In various electric heating systems it is desired to heat a body up to a certain elevated temperature by supplying heat thereto, generally at a relatively high rate, and to thereafter continue the supply of heat to said body, generally at a relatively high rate, for a predetermined time, regardless of the time or heat input required to heat the body up to the certain elevated temperature.

In some cases, the particular purpose of the continued heating is to maintain the body at a desired temperature or within a desired temperature range for a definite period of time. For example, in certain types of apparatus for brewing coffee or cooking eggs, it may be desired to heat a body of water to boiling temperature and then maintain it at that temperature for a selectively predetermined period of time, for the purpose of effecting infusion of the coffee or the cooking of the egg, regardless of the time or heat input required to heat the body of water up to boiling temperature.

In the operation of such electric heating systems there are many variable factors that affect the time and heat input required to heat the body from its initial temperature up to a given elevated temperature, such as variations in the initial temperature of the body, variations in the mass of the body or its specific heat or other factors that determine the amount of heat required to produce a given increase in temperature, variations in ambient temperature, or variations in the rate of heat dissipation from the body to its surroundings. Variations in the initial temperature of the surroundings also have an important effect. For example, in heating a body of water or other liquid in a receptacle, the time and heat input required to heat it to a given elevated temperature are dependent not only upon the initial temperature of the liquid but also upon the initial temperature of the receptacle.

The principal object of my invention is to provide for accurate control of the time during which a body is heated, preferably at a relatively high rate, after it has been heated to a certain elevated temperature, regardless of the time or heat input required to heat the body to such elevated temperature, and without requiring manual setting of a timing device each time such a body is so heated.

Another object of the invention is to provide for heating a body to a certain elevated temperature, preferably by supplying heat thereto at a relatively high rate; for continuing to supply heat to the body, preferably at a relatively high rate for a predetermined time after reaching such tempertaure; and for reducing the rate of supply of heat to the body at the end of such predetermined time. A further object is to provide for supplying heat to such body at a reduced rate after it has been heated for a predetermined time at a relatively high rate.

A particular object of the invention is to provide a heating system that is capable of carrying out successive heating cycles in which a body is heated to a desired temperature and is thereafter heated, preferably at a relatively high rate, for a predetermined period of time, regardless of the time or heat input required to heat the body to the desired temperature in each heating cycle, without requiring manual resetting of a timing device for each successive cycle, and without requiring the re-establishment of a low initial temperature of the body between successive cycles, that is, on initial temperature much lower than the temperature to which the body is to be heated in each cycle.

Another object is to provide a heating system having the above mentioned characteristics and in which the means employed for controlling the length of time the body is heated, preferably at a relatively high rate, after reaching the desired elevated temperature may be quickly and automatically restored to condition for controlling a successive heating cycle.

Another object of the invention is to provide a system having the above characteristics in which an electric signal device is energized at a predetermined additional time interval after the rate of heat supply to the body has been reduced.

A further object is to provide for automatically reducing the rate of heating a body after it has been heated at a relatively high rate for a predetermined time after reaching a given elevated temperature. In connection therewith, a further object is to provide for energizing an electric signal device, such as a lamp, at a predetermined time interval after the rate of heating has been reduced.

The electric heating system of my invention may be employed for various purposes but it is particularly useful in connection with automatic coffee makers or other types of apparatus in which it is desired to heat a body of liquid to boiling temperature and to then maintain it at that temperature for a given period of time. In such applications, particular objects of the invention are to provide for accurate control of the time during which the body of liquid is maintained at boiling temperature, regardless of the time or heat input required to heat it to that temperature and without requiring manual setting of a timing device each time a body of liquid is to be so heated; to enable successive heating cycles to be carried out without requiring manual resetting of a timing device for each successive cycle and without requiring re-establishment of a much lower initial temperature of the body of liquid betwen successive cycles; and to automatically reduce the rate of heating the liquid after it has been maintained at boiling temperature for the desired length of time. A further object in this connection is to provide advantageous means for preventing overheating of the receptacle for receiving the body of liquid to be heated, in the event of failure of the automatic control means to function properly or in the event a heating cycle is inadvertently started without any liquid in the receptacle.

Other objects and advantages of the invention will be pointed out hereinafter or will be apparent from the following description.

The heating system in accordance with my invention includes main electric heating means adapted to supply heat, preferably at a relatively high rate, to a body that is to be heated, and auxiliary electric heating means used to control the time of heating the body by the main heating means after the body has reached a certain elevated temperature. The auxiliary heating means preferably is also used to supply heat to the body at a relatively low rate after the deenergization of the main heating means.

The system further includes a first temperature responsive switch device positioned to receive from the body heat produced by operation of the main heating means and operable at a predetermined temperature to energize the auxiliary heating means, and a second temperature responsive switch device that is heated principally by the auxiliary heating means and is operable at a substantially higher temperature to deenergize only the main heating means while leaving the auxiliary heating means energized.

The first temperature responsive switch device is preferably so located as to provide for ready transfer of heat thereto from the body to be heated, so that the switch device is operated primarily in response to the temperature of the body and thereby operates to energize the auxiliary heating means when the body has attained a certain elevated temperature.

The second temperature responsive switch device is located in such heat transfer relation with respect to the auxiliary heating means as to be heated primarily thereby and thus cause deenergization of the main heating means at a predetermined time interval after the auxiliary heating means is energized, and is preferably so located as to provide for some transfer of heat therefrom to the body to be heated, for reasons that will be explained hereinafter.

The first temperature responsive switch device is preferably also in partial heat receiving relation to the auxiliary heating means so as to maintain the auxiliary heating means energized in response to heat received therefrom after the main heating means is deenergized.

The second temperature responsive switch device preferably is also operable to energize an electric signal device at an additional predetermined time following operation thereof to deenergize the main heating means.

The above and other features of the invention and the mode of operation thereof will be described more fully with reference to the accompanying drawings in which.

In the form of heating system shown in Figs. 1 through 7, a body to be heated is indicated at A, and is illustrated as comprising a vessel 1, of which only the lower portion is shown, adapted to contain a body of water or other liquid. The vessel may be of any suitable shape and may, for example, be the container of a coffee maker of the type in which a quantity of water is heated to boiling in such a container, and is then displaced by steam pressure into an infusion receptacle containing ground coffee and, after a desired infusion period, the boiling is stopped and the brewed coffee is transferred from the infusion receptacle back into the container. One form of coffee maker of this type is described in my application Ser. No. 241,564, filed August 13, 1951.

Figure 1:
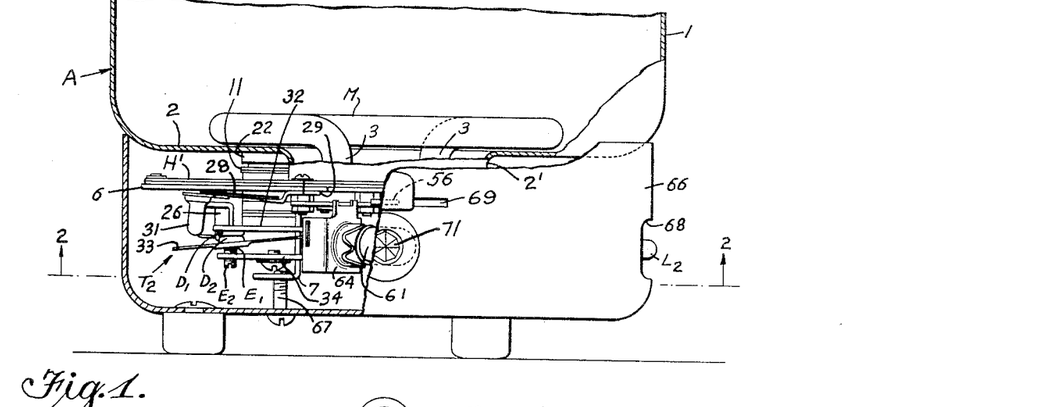
Fig. 1 is a vertical section, partly in elevation, showing a portion of an automatic coffee maker provided with an electric heating system according to this invention.
Figure 2:
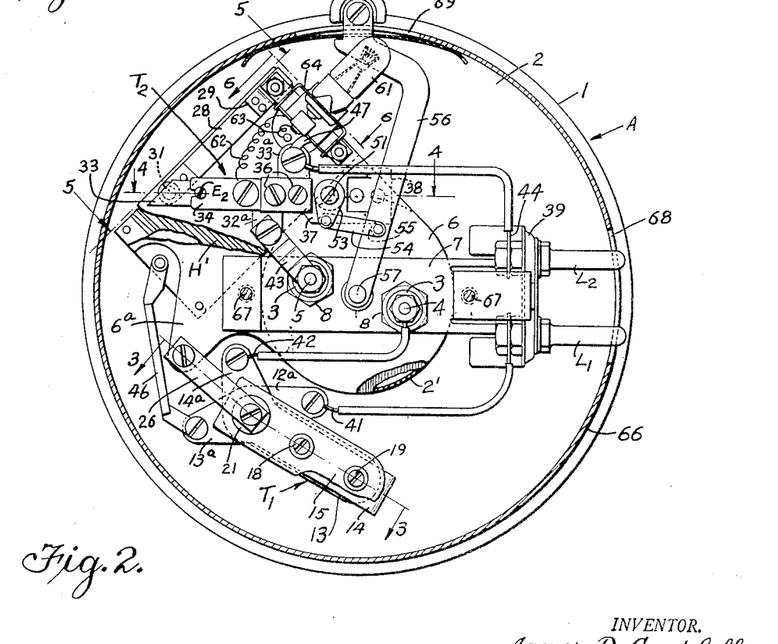
Fig. 2 is an inverted horizontal section on line 2—2 of Fig. 1.

The automatically controlled electric heating means is shown as mounted upon the bottom wall 2 of the vessel 1, in position to heat the vessel and the liquid therein. Hence, either the vessel itself, or the liquid therein, or both, may be regarded as the body A that is heated by the heating means.

The heating system includes main electric heating means, which is shown as an electric heating element M of the immersion type located within the lower part of the vessel 1.

Figures 4, 5, 6, 7:
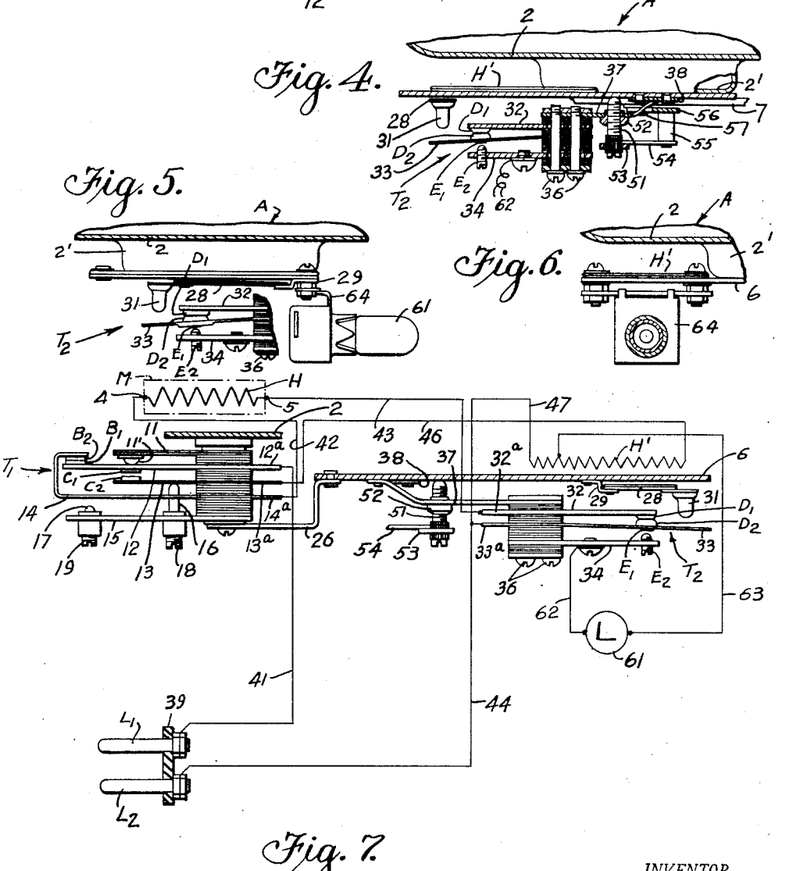
Fig. 4 is a vertical section on line 4—4 in Fig. 2, showing the second temperature responsive switch device and the auxiliary heating means.
Figs. 5 and 6 are vertical sections on lines 5—5 and 6—6 respectively in Fig. 2.
Fig. 7 is a diagrammatic view of the heating system shown in Figs. 1-6.

It may be, for example, a stainless steel sheathed tubular heating unit, whose end portions 3 extend, in a suitably sealed manner, through a downwardly recessed central portions 2' (Figs. 2 and 4) of bottom wall 2 and are provided with projecting terminals 4 and 5 connected to the ends of the main heater coil which is enclosed within the sheath of element M and is shown diagrammatically at H in Fig. 7. The main heating means M is located close to the bottom wall 2 of the vessel so as to be immersed within the liquid therein and in position to heat both the liquid and the vessel.

The other elements of the heating system are shown as located outside the vessel 1 and below the bottom wall 2, and may be mounted on the bottom wall either directly or by suitable supporting means secured thereto, such as a horizontally extending plate 6 and a bracket 7 secured to the downwardly recessed central portion 2' of said bottom wall as by means of nuts 8 engaging the projecting end portions of the tubular sheath of the main heating unit M. These other elements of the system shown include a pair of input terminals $L_1$ and $L_2$ for connection to a suitable source of electric current such as an ordinary 110–120 volt A. C. supply circuit, auxiliary electric heating means H', a first temperature responsive switch device or thermostat $T_1$, which may be designated as a pilot thermostat, and a second temperature responsive switch device or thermostat $T_2$, which may be designated as a timing thermostat.

The auxiliary heating means H' is located above and close to the supporting plate 6 and is secured in good heat transfer relation thereto and insulated electrically therefrom in any suitable manner. In the particular application shown, it has two principal functions, serving when energized both to heat the timing thermostat $T_2$ and to also act as a "warming" heater for the vessel 1 and its contents by supplying some heat thereto but at a lower rate than the main heating means M. It is located below the bottom wall 2 and spaced therefrom, in position to transfer heat to the vessel and its contents partly by radiation to said wall and partly by conduction through plate 6 to said wall, the plate 6 being in direct contact with the downwardly recessed central portion 2' of the bottom wall in good heat transfer relation thereto. However, the auxiliary heating means H' is in less intimate thermal contact with the vessel and its contents than the main heating means M. Furthermore, the main heating means is preferably of relatively low resistance and of relatively high heating rate, while the auxiliary heating means is preferably of relatively high resistance and of relatively low heating rate. For example, when used in connection with a coffee maker of the type described in my above mentioned application Ser. No. 241,564, the main heating means M may have a heating rate of about 800 watts and the auxiliary heating means H' may have a heating rate of about 40 watts, the resistance of the latter being in that case about twenty times that of the former.

Figure 3:
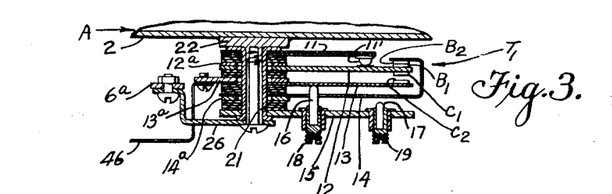
Fig. 3 is a vertical section showing the first temperature responsive switch device, taken on line 3—3 in Fig. 2.

The first or pilot thermostat $T_1$ is shown as mounted directly on the bottom wall 2. As best shown in Figs. 3 and 7, it is provided with a pair of normally closed safety shut-off contact members $B_1$ and $B_2$ in the circuit of the main heater coil H, a pair of normally open contact members $C_1$ and $C_2$ in the circuit of auxiliary heating means H', and a bimetallic actuating member 11 that moves downward upon heating, to "close" the contacts $C_1$ and $C_2$ and, upon further heating, to "open" the contacts $B_1$ and $B_2$.

The thermostat $T_1$ may be for any suitable type. In addition to the bimetallic member 11, it is shown as comprising a leaf spring 12 carrying contact buttons $B_1$ and $C_1$, a leaf spring 13 carrying contact button $C_2$, a leaf spring 14 carrying contact button B₂, and an arm 15 on which insulating members 16 and 17 are mounted for vertical adjustment by means of a temperature adjusting screw 18 and a safety shut-off adjusting screw 19. All of these elements are mounted on a metallic support sleeve 21 which is mounted in good heat conducting relation to the bottom wall 2 as by means of a metal disc 22 secured to said bottom wall. The bimetallic member 11 is secured in good heat conducting relation to the metallic sleeve 21, so as to receive heat from bottom wall 2 by conduction through disc 22 and sleeve 21. Furthermore, the bimetallic member 11 is located close to bottom wall 2 so as to receive heat therefrom by radiation. Thus, the thermostat $T_1$ is so positioned as to receive, from the body A to be heated, heat produced by operation of the main heating means M.

The insulating member 16 engages leaf spring 13 to position the latter relative to the leaf spring 12. Vertical adjustment thereof by means of screw 18 raises or lowers the spring 13 and thus serves to vary the position of contact member $C_2$ relative to contact member $C_1$ and regulate the tmeperature at which said contact members are closed by downward movement of bimetallic member 11, which is provided with an insulating button 11' engaging spring 12.

The leaf springs 12, 13 and 14 are mounted on sleeve 21 in an insulated manner, said springs being in contact with projecting terminal members 12a, 13a, and 14a respectively (Fig. 2) for connection of electrical conductors thereto.

Although the pilot thermostat $T_1$ operates primarily in response to heat received from the body A, I also provide for a limited transfer of heat to the bimetallic member 11 thereof from the auxiliary heating means H', as by means of a heat conducting strip 26 of copper or other suitable material, connected to the metallic sleeve 21 and to a portion 6a of the plate 6 on which said auxiliary heating means is mounted.

The second or timing thermostat $T_2$ as best shown in Figs. 4 and 5, is also mounted on plate 6 and is provided with a pair of normally closed contacts $D_1$ and $D_2$ in the circuit of the main heater coil H, a pair of normally open signal circuit contacts $E_1$ and $E_2$, and a bimetallic actuating member 28 that moves downward upon heating, to "open" the contacts $D_1$ and $D_2$ and, upon further heating, to "close" the contacts $E_1$ and $E_2$.

The bimetallic member 28 is located immediately beneath the plate 6, below the position of the auxiliary heating means H'. It is shown as mounted on plate 6 by means of a small mounting bracket 29 secured to said plate, and is provided at its outer end with a contact engaging element 31 of suitable insulating material such as porcelain. The bracket 29 may, if desired in order to limit the rate of heat transfer from plate 6 to the bimetallic member, be made of material of relatively low heat conductivity such as Invar metal. Thermostat $T_2$ further includes an arm 32 carrying contact button $D_1$, a leaf spring 33 positioned to be engaged by element 31 of the bimetallic member 28 and carrying contact buttons $D_2$ and $E_1$, and an arm 34 carrying contact member $E_2$. The contact member $E_2$ is shown as a screw threadedly engaging said arm for vertical adjustment relative to contact button $E_1$, and serves as a signal time delay adjusting screw. The elements 32, 33, and 34 are mounted in an insulated manner and are shown as secured by screws 36 to an adjustable mounting member 37 in the form of an upwardly biased resilient element having a portion 38 secured to plate 6. Arm 32 and spring 33 are provided with projecting terminal members 32a and 33a (Fig. 2) for connection of electrical conductors thereto.

The bimetallic member 28 is heated principally by the auxiliary heating means H', receiving heat by both conduction and radiation from the plate 6 above it, which is in turn heated by the heating element H' mounted thereon. However, since the bimetallic member 28 is mounted on plate 6 which is in heat conducting relation to the body A to be heated, it is so located as to receive some heat from the body A and also provide for transfer of heat therefrom to the body A when the latter is at a lower temperature than the bimetallic member.

The input terminals $L_1$ and $L_2$ are suitably insulated and are supported by a mounting member 39 secured to bracket 7.

Starting at input terminal $L_1$, the energizing circuit of the main heater coil H of heating means M includes conductor 41, leaf spring 12, normally closed contacts $B_1$, $B_2$, leaf spring 14, conductor 42 leading to one heater terminal 4, conductor 43 leading from the other heater terminal 5, arm 32, normally closed contacts $D_1$, $D_2$, leaf spring 33, and conductor 44 leading from leaf spring 33 to the other input terminal $L_2$. One end of the auxiliary heating means H' is connected by conductor 46 to leaf spring 13 carrying the normally open contact $C_2$, while the other end of said heating element is connected by conductor 47 to conductor 44 which leads to input terminal $L_2$. Closing of contacts $C_1$ and $C_2$ will thus complete a circuit through the auxiliary heating means H', since contact $C_1$ is connected to input terminal $L_1$ through leaf spring 12 and conductor 41.

The contact elements of thermostat $T_2$ are adjustable relative to the bimetallic member 28 by vertical adjustment of the resilient mounting element 37 (Fig. 4) relative to the plate 6 on which the bimetallic member is mounted. For this purpose I have provided a heating time adjusting screw 51 engaging a nut 52 secured to resilient mounting element 37. Screw 51 bears at its upper end against plate 6 and is provided at its lower end with a lever arm 53 secured thereto. A link 54 connects lever arm 53 to a post 55 secured to a manually operable time adjusting arm 56 pivotally mounted at its inner end on a bearing pin 57 secured to bracket 7. Pivotal movement of arm 56 operates through link 54 and lever arm 53 to turn the adjusting screw 51 and thereby raise or lower the contact assembly of thermostat $T_2$ relative to bimetallic member 28.

The normally open contact members $E_1$ and $E_2$ of thermostat $T_2$ are connected in the circuit of an electric signal device so as to energize said signal device at a predetermined time following deenergization of the main heating means M. The signal device preferably comprises a low voltage electric lamp 61 arranged to be connected in parallel with a few turns of the auxiliary heating element H' upon closing of contacts $E_1$ and $E_2$. For this purpose one terminal of lamp 61 is connected through wire 62 to the arm 34 carrying adjustable contact member $E_2$ and the other terminal thereof is connected through wire 63 to an intermediate tap on heating element H'. The lamp 61 is shown as mounted in a supporting socket 64 secured to plate 6 and provided with suitable means for establishing connections between the lamp terminals and the respective wires 62 and 63.

The parts of the system located below the bottom wall 2 of vessel 1 are shown as enclosed within a housing member 66 secured to mounting bracket 7 by means of screws 67. Housing 66 is provided with an opening 68 permitting access to input terminals $L_1$ and $L_2$ for connection to current supply means and with an arcuate slot 69 through which the outer end of adjusting arm 56 projects to permit manual adjustment thereof. Said housing is also shown as provided with a small glass window 71 adjacent the signal lamp 61 so as to be illuminated by said lamp when energized.

In normal use of the above described heating system, the input terminals $L_1$, $L_2$ are connected to suitable current supply means while the vessel 1 and the liquid therein, comprising the body A that is to be heated, are at some initial temperature below that to which the body is to be heated, and the bimetallic members and contact assemblies of thermostats $T_1$ and $T_2$ may be assumed to be in the normal positions shown in the drawings. Since contacts $B_1$, $B_2$ and $D_1$, $D_2$ are closed, a circuit is completed through the main heater coil H of heating means M as described above, thus energizing it at its relatively high heating rate and causing rapid heating of the body A. Since contact members $C_1$, $C_2$ and $E_1$, $E_2$ are open, the auxiliary heating means H' and signal lamp 61 are not energized.

The bimetallic actuating member 11 of pilot thermostat $T_1$ receives from the body A heat produced by the main heating means M, causing it to move downward and, upon heating to a certain temperature, closes contacts $C_1$ and $C_2$ and thus energizes the auxiliary heating means H'. By means of adjusting screw 18 as described above, thermostat $T_1$ is so adjusted that the downward movement of leaf spring 12 by member 11 closes contact members $C_1$ and $C_2$ when the thermostat is heated to a selectively predetermined temperature, corresponding to a certain desired temperature of the body A, which determines the start of a predetermined period of time during which it is desired to continue to heat the body A at a relatively high heating rate by the main heating means M.

Assume, for example, that it is desired to heat a body of water in vessel A to boiling temperature and to thereafter maintain it at that temperature for a predetermined time by continued rapid heating, as in the case in automatic coffee makers of the type mentioned above and as illustrated in my above mentioned pending application Ser. No. 241,564. The thermostat $T_1$ is, for this purpose, so adjusted as to close the contacts $C_1$, $C_2$ when the water reaches a certain elevated temperature approximating but preferably somewhat below boiling temperature. The predetermined temperature at which the thermostat is set to operate, that is, the temperature of the bimetallic member 11 at which it operates to close contacts $C_1$, $C_2$, is somewhat below the corresponding temperature of the body A, due to the temperature differential occurring between the body A and the bimetallic member, and proper allowance for this temperature differential must be made.

I have found it advantageous in such cases, to so construct and adjust the thermostat $T_1$ as to close contacts $C_1$, $C_2$ when the temperature of the water is somewhat below sea level boiling temperature, for example, at about 180° to 190° F. Since the main heating means continues to heat the water rapidly, the time required thereafter to heat the water to boiling temperature is relatively short compared to the time during which boiling of the water is to be continued. Therefore, the system operates to heat the water to boiling temperature and to maintain it at that temperature for a period of time consistently within very close limits, even though the predetermined time during which the main heating means remains energized following closing of contacts $C_1$, $C_2$ is started somewhat before the water reaches boiling temperature.

Closing of contacts $C_1$, $C_2$ establishes a circuit through the auxiliary heating means H', thus energizing the latter while the main heater coil H also remains energized to continue the heating of body A at a high rate. In the assumed example mentioned above, the water is thus heated to boiling temperature and is then maintained at that temperature as long as the main heating means remains energized.

The bimetallic actuating member 28 of timing thermostat $T_2$ is heated by the auxiliary heating means H', causing it to move downward and engage leaf spring 33 and thus separate contact member $D_2$ from contact member $D_1$ at a predetermined time following energization of the auxiliary heating means. Opening of contacts $D_1$, $D_2$ breaks the circuit through the main heater coil H and deenergizes it, causing a reduction in the rate of heating the body A. In the assumed example, this causes the water to stop boiling, so that the time required for operation of the thermostat $T_2$ to deenergize the main heater coil H in response to heat received from the auxiliary heating means H' determines the length of the brewing cycle. This period may be varied by manual operation of the time adjusting arm 56 to vary the position of the contact assembly of thermostat $T_2$ relative to the initial position of the bimetallic member 28 as described above.

The bimetallic member 28 of the timing thermostat $T_2$ is in good heat transfer relation to the auxiliary heating means H' as to be heated thereby to a relatively high temperature in spite of the low heating rate of the auxiliary heating means. The thermostat $T_2$ is designed and constructed to open the contacts $D_1$, $D_2$ at a substantially higher temperature than that to which the body A is heated by the main heating means. Thus, the time required for operation of the timing thermostat to deenergize the main heating means is substantially entirely a function of the period of energization of the secondary heating means and is substantially independent of the initial temperature of the body A and of other factors that may cause variations in the time required to heat said body to the desired temperature.

It will be observed that the above described operation of the timing thermostat $T_2$ to open contacts $D_1$, $D_2$ and thus deenergize the main heater coil H does not affect the circuit of the auxiliary heating means H', so that the auxiliary heating means remains energized. Thus, the timing thermostat $T_2$ operates upon heating to a certain temperature following energization of the auxiliary heating means H', to deenergize the main heating means, while leaving the auxiliary heating means energized. This continued operation of the auxiliary heating means following deenergization of the main heating means is an important factor in the operation of the heating system. It serves to hold contacts $D_1$, $D_2$ of thermostat $T_2$ open and thus prevents undesired re-energizing of the main heater coil H, and is also utilized to accomplish certain other functions as described below.

In automatic coffee makers of the type mentioned above, it requires a short period of time to complete the brewing cycle and return the brewed coffee to the vessel in which the water was boiled. Following the opening of contact members $D_1$, $D_2$ the continued operation of auxiliary heating means H' causes further downward movement of bimetallic member 28 and leaf spring 33 of the thermostat $T_2$ and, after a short further interval sufficient to permit completion of the brewing cycle, closes contacts $E_1$, $E_2$ to cause energization of signal lamp 61 as described above, thus giving a visible indication that the brewing cycle is completed. The duration of this additional time interval following deenergizing of the main heating means may be controlled by adjustment of the signal time delay adjusting contact screw $E_2$ relative to the normal position of the coacting contact member $E_1$ carried by leaf spring 33.

The auxiliary heating means H' continues to supply heat at a relatively low rate to the body A. In the case of an automatic coffee maker, the heat so supplied is sufficient to keep the coffee warm but is not sufficient to cause boiling and consequent re-cycling thereof.

After the main heating means M has been deenergized, the plate 6 and heat conducting strip 26 serve to conduct sufficient heat from the auxiliary heating means H' to the bimetallic actuating member 11 of pilot thermostat $T_1$ to insure that said actuating member will remain depressed sufficiently to hold contact member $C_1$ in engagement with contact member $C_2$. Thus, the auxiliary heating means H' serves, under normal conditions, to maintain its own circuit closed after the circuit has been initially established in response to heat from the main heating means M, and it will therefore continue to supply heat at its relatively low rate to the body A as long as current is supplied to the systems.

When the supply of current is interrupted by disconnecting the terminals $L_1$, $L_2$ from the current supply means, the auxiliary heating means $H'$ ceases to produce heat, and both thermostats $T_1$ and $T_2$ cool sufficiently to open the contacts $C_1$, $C_2$ of thermostat $T_1$, and to open the contacts $E_1$, $E_2$ and close the contacts $D_1$, $D_2$ of thermostat $T_2$. Thus, following interruption of the supply of current to the auxiliary heating means $H'$, the thermostat $T_1$ is operable upon cooling to open the contacts $C_1$, $C_2$ in the circuit of the auxiliary heating means, and the thermostat $T_2$ is operable upon cooling to open the contacts $E_1$, $E_2$ in the circuit of the signal lamp 61 and reclose the contacts $D_1$, $D_2$ in the circuit of the main heater coil H, thereby automatically restoring the system to its initial condition, ready to control a successive heating cycle without requiring manual resetting.

It will be seen, therefore, that the above described heating system may be used to carry out successive heating cycles in which a body is heated to a certain elevated temperature and is thereafter heated rapidly for a selectively predetermined period of time, without requiring manual resetting of any timing device or other control device between successive cycles. However, the duration of the heating period after the body has reached the certain elevated temperature may, if desired, be selectively adjusted for each heating cycle by manual operation of time adjusting arm 56 as described above.

Another advantage is that it is not necessary to reestablish a uniform low initial temperature of the body to be heated, following completion of one heating cycle and before initiating a successive heating cycle. The only requirement is that the initial temperature of the body to be heated be below the certain elevated temperature that determines the start of the selectively predetermined heating period. In the case of an automatic coffee maker of the type mentioned above, successive automatically controlled brewing cycles can be carried out without requiring that the vessel 1 and the water therein be at atmospheric temperature or at some uniform low initial temperature at the start of each brewing cycle. If the vessel and metal parts connected thereto contain some residual heat from a previous brewing cycle, it is not necessary to use cold water or other means to cool them to the same initial temperature as prevailed at the start of the previous cycle. Thus, if the thermostat $T_1$ is constructed and adjusted to close contacts $C_1$, $C_2$ when the water temperature reaches some desired value such as 180° to 190° F., as in the specific example given above, it is only necessary that the temperature of the water and the vessel be below this desired value at the start of each brewing cycle. Of course, the temperature of thermostats $T_1$ and $T_2$ must also be reduced sufficiently to restore the contacts to their normal conditions at the start of each brewing cycle. Generally this may be accomplished most conveniently by disconnecting terminals $L_1$ and $L_2$ from the supply line to deenergize the system for a short period of time, as described above, and then re-connecting the terminals to the supply line.

During normal operation of the system to control a heating cycle as described above, the safety shut-off contact members $B_1$ and $B_2$ of the thermostat $T_1$ remain closed since leaf spring 14 is biased downward so as to follow leaf spring 12 as the latter is depressed by downward movement of bimetallic actuating member 11 within the temperature range to which the body A is heated. However, if the bimetallic member 11 is heated to an abnormally high temperature above the normal operating range, the leaf spring 14 will engage the insulating stop member 17 and further downward movement of leaf spring 12 will separate contact member $B_1$ from contact member $B_2$, thus breaking the circuit of the main heater coil H and preventing overheating of the vessel 1 or any part of the control system. The stop member 17 may be adjusted by means of screw 19, to vary the temperature at which the safety shut-off contacts $B_1$, $B_2$ opened.

Operation of thermostat $T_1$ to open contacts $B_1$, $B_2$ in this manner will prevent excessive heating in the event the auxiliary heating means $H'$ should burn out or in case the secondary thermostat $T_2$ should be improperly adjusted or if, for any other reason, the secondary thermostat does not operate properly to open the contacts $D_1$, $D_2$ in the circuit of the main heating means. In the case of an automatic coffee maker, it will also prevent possible overheating in case the system is connected to the current supply means without any water in the vessel 1, in which case the main heating means M may heat the vessel to an abnormally high temperature before the timing thermostat $T_2$ has operted to open the contact members $D_1$, $D_2$.

Figure 8:
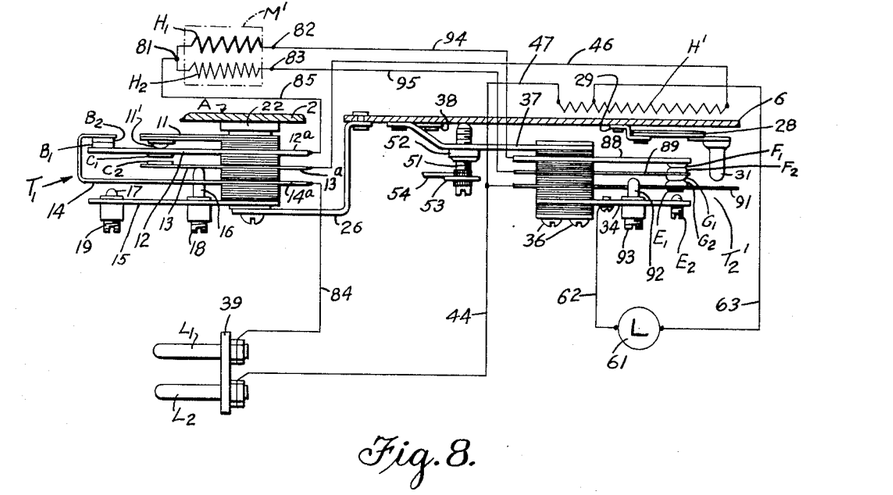
Fig. 8 is a diagrammatic view illustrating another form of heating system according to this invention.
Figure 9:
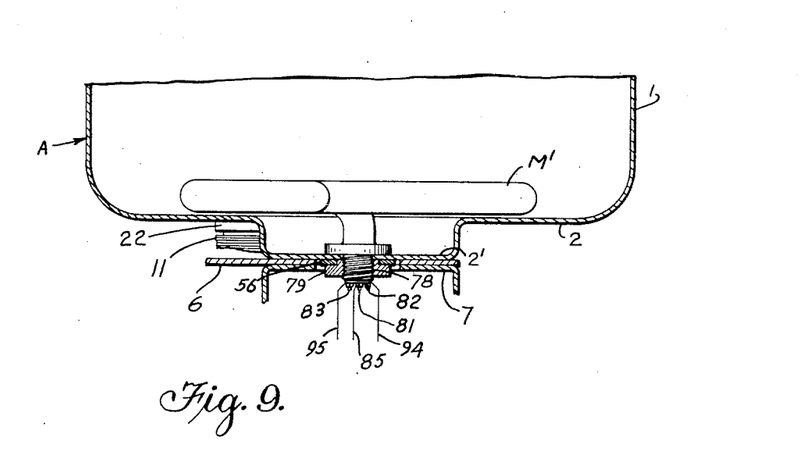
Fig. 9 is a vertical section of a portion of an automatic coffee maker provided with a modified form of main heating means as shown in Fig. 8.

Various modifications may be made in the above described heating system, and certain possible modifications are illustrated in the form of heating system shown in Figs. 8 and 9.

In this case the body A to be heated is again shown as comprising a vessel 1 adapted to contain a body of water in the same manner as before. The main electric heating means, however, is a two-speed heating unit $M'$ provided with two separate heater coils $H_1$ and $H_2$ having heating rates, for example, of 700 watts and 200 watts respectively. The heating unit $M'$ is shown as a stainless steel sheathed tubular element having a threaded end portion 78 located centrally of the vessel 1, projecting downward through the portion $2'$ of the bottom wall of the vessel and secured in sealing relation thereto by a nut 79. The projecting end portion of the heating unit $M'$ is provided with three projecting terminals 81, 82 and 83. Terminal 81 is a common terminal connected to one end of both coils $H_1$ and $H_2$. Terminal 82 is connected to the other end of coil $H_1$, and terminal 83 is connected to the other end of coil $H_2$.

The first or pilot thermostate $T_1$ is the same as described above and is similarly mounted and positioned, and the elements thereof are identified by the same reference numerals. The common terminal 81 of heating means $M'$ is connected to one input terminal $L_1$ through the normally closed safety shut-off contact members $B_1$, $B_2$ of thermostat $T_1$. If desired, it may be so connected in the same manner as terminal 4 of heating means M described above. However, I have shown in Fig. 8 a modified arrangement which may be advantageous in certain cases, in which the input terminal $L_1$ is connected by conductor 84 to leaf spring 14 carrying contact member $B_2$, and leaf spring 12 carrying contact members $B_1$ and $C_1$ is connected by conductor 85 to the common terminal 81 of heating means $M'$. One terminal of the auxiliary heating means $H'$ is connected by conductor 46 to leaf spring 13 carrying contact member $C_2$ in the same manner as before. However, it will be seen that in this case the circuit from the input terminal $L_1$ to the auxiliary heating means $H'$ includes not only the normally open contacts $C_1$, $C_2$ but also the normally closed safety shut-off contacts $B_1$, $B_2$. Thus, the latter are not only in the circuit of both the main heater coils $H_1$ and $H_2$ but also in the circuit of the auxiliary heating means $H'$. Said auxiliary heating means is the same as previously described and is similarly mounted and connected in relation to other elements of the system.

The second or timing thermostat $T_2'$ is also generally similar to the thermostat $T_2$ as described above, except for certain modifications in the contact assembly thereof to provide for successively deenergizing the main heater coils $H_1$ and $H_2$. It is provided with a first pair of normally closed contacts $F_1$ and $F_2$ in the circuit of one main heater coil $H_1$, and a second pair of normally closed contacts $G_1$ and $G_2$ in the circuit of the other main heater coil $H_2$. The thermostat $T_2'$ is also shown as having a pair of normally open signal circuit contacts $E_1$ and $E_2$, mounted in the same manner as before and similarly connected in the circuit of a signal lamp 61.

The bimetallic actuating member 28 is the same as before and is similarly mounted and similarly positioned in heat transfer relation to other elements of the system. It is operable by downward movement, upon heating by auxiliary heating means H', to "open" the first pair of heater contacts $F_1$ and $F_2$ at one temperature, to "open" the second pair of heater contacts $G_1$ and $G_2$ at a somewhat higher temperature, and to "close" the signal circuit contacts $E_1$ and $E_2$ at a still higher temperature.

The contact assembly of thermostat $T_2'$ is shown as carried by a resilient mounting member 37 which may be mounted as before and provided with manually operated adjusting means. This contact assembly is shown as including an arm 88 comparable to arm 32 above and carrying contact button $F_1$, a leaf spring 89 carrying contact buttons $F_2$ and $G_1$, a leaf spring 91 carrying contact buttons $G_2$ and $E_1$, and an arm 34 carrying adjustable contact member $E_2$ as described above. Leaf spring 91 is so biased upward as to normally hold both pairs of heater contacts $F_1$, $F_2$ and $G_1$, $G_2$ in closed position, and extends outward in position to be engaged and moved downward by the element 31 of bimetallic member 28 upon downward movement of the latter. Leaf spring 89 is biased downward so as to follow leaf spring 91 during initial downward movement of the latter, thus opening contacts $F_1$, $F_2$ while holding contacts $G_1$ and $G_2$ closed.

Downward movement of leaf spring 89 is limited, however, by an insulating member 92 which is shown as extending through an opening in leaf spring 91 and mounted on arm 34 for vertical adjustment by means of an adjusting screw 93. Raising or lowering of the entire contact assembly by rotation of adjusting screw 51 in the manner described above serves to adjust the temperature at which the element 31 of bimetallic member 28 engages leaf spring 91 to open contacts $F_1$, $F_2$, while adjustment of member 92 by screw 93 regulates the additional temperature rise required to open contacts $G_1$, $G_2$.

Leaf spring 91 is connected by conductor 44 to input terminal $L_2$. Contact arm 88 and leaf spring 89 are connected by conductors 94 and 95 to the terminals 82 and 83 of the respective heater coils $H_1$ and $H_2$. Thus, the above described adjustments of thermostat $T_2'$ serve to selectively predetermine the time intervals, following energization of auxiliary heating means H', at which said thermostat operate to deenergize first the heater coil $H_1$ and thereafter the heater coil $H_2$.

The means for manually operating the heating time adjusting screw 51 may be substantially the same as before, comprising a pivotally mounted time adjusting arm 56 operatively connected to said adjusting screw by a post 55, link 54, and lever arm 53, in substantially the same manner as described above and shown in Figs. 2 and 4. In this case, however, the inner end of the manually operated adjusting arm 56 may conveniently be mounted pivotally on a bearing portion on nut 79, as shown in Fig. 9.

The other elements of the heating system shown in Figs. 8 and 9 are substantially the same as in the system shown in Figs. 1 through 7, and are identified in part by similar reference numbers. However, the plate 6 and bracket 7 are shown in Fig. 9 as provided with central openings to receive the nut 79 and the inner end of the adjusting arm 56, and may be secured to each other and to the bottom wall portion 2' of vessel 1 in any suitable manner, as by spot welding.

In the normal operation of this form of heating system, upon energizing thereof by connecting input terminals $L_1$, $L_2$ to a suitable supply line, the main heating means M' operates at its maximum heating rate since both coils $H_1$ and $H_2$ are energized, so as to rapidly heat the body A, such as vessel 1 and the water or other liquid therein. The pilot thermostat $T_1$ operates in the same manner as before to close contacts $C_1$, $C_2$ and thus energize the auxiliary heating means H' when the body A reaches a certain elevated temperature.

Operation of auxiliary heating means H' serves as before, to heat the bimetallic element 28 of the timing thermostat $T_2'$. At a predetermined time after energization of the auxiliary heating means as determined by the setting of the adjusting screw 51, the element 31 of the bimetallic member engages and depresses leaf spring 91, thus separating contact $F_2$ from contact $F_1$ and deenergizing the heater coil $H_1$ of the main heating means while the other heater coil $H_2$ remains energized so as to continue heating the body A but at a reduced heating rate. This reduction of the heating rate may be advantageous in certain cases in order to prevent unduly or unnecessarily rapid heating of the body A after it has attained a certain desired temperature. However, the position of the main heating means M' and the heating rate of the heater coil $H_2$ thereof are such that this reduced rate of heating the body A is still greater than the rate at which said body is heated by the auxiliary heating means H' following complete deenergization of the main heating means.

Continued operation of auxiliary heating means H' causes further downward movement of bimetallic member 28 and leaf spring 91. The leaf spring 89 also moves downward to maintain contacts $G_1$, $G_2$ closed for an additional period. At a predetermined later time following energization of the auxiliary heating means H', downward movement of leaf spring 89 is arrested by engagement thereof with stop member 92, and further downward movement of leaf spring 91 separates contact $G_2$ from contact $G_1$, thus interrupting the circuit of heater coil $H_2$ and fully deenergizing the main heating means M'.

Except for the differences mentioned above, the normal operation of this system is the same as the form shown in Figs. 1 through 7, and it has the same advantageous characteristics as brought out above. As before, the contacts $B_1$, $B_2$ remain closed during normal operation. However, if the bimetallic member 11 of thermostat $T_1$ is heated to an abnormally high temperature due to any cause such as mentioned above, it will operate as before to separate contact $B_2$ from contact $B_1$. Since these contacts are in the energizing circuit of the main heating means M' and the auxiliary heating means H', this will interrupt the circuits of both the main and auxiliary heating means and thus prevent overheating of any part of the system or of the body A.

I claim:

1. In an electric heating system, the combination comprising: main electric heating means; auxiliary electric heating means; a first temperature responsive switch device disposed in heat transfer relation to said main heating means so as to receive heat produced by said main heating means upon energization thereof and operable, upon heating to a certain temperature, to energize said auxiliary heating means; and a second temperature responsive switch device disposed in heat transfer relation to said auxiliary heating means so as to be heated principally by operation of said auxiliary heating means and operable, upon heating to a certain temperature after energization of said auxiliary heating means, to energize only said main heating means while leaving said auxiliary heating means energized; said first temperature responsive switch device being also disposed in heat transfer relation to said auxiliary heating means so as to receive heat therefrom upon energization thereof and thereby maintain said auxiliary heating means energized following the deenergizing of said main heating means by said second temperature responsive switch device.

2. In an electric heating system, the combination as set forth in claim 1, in which said second switch device operates to deenergize said main heating means at a temperature substantially higher than the temperature at which said first switch device operates to energize said auxiliary heating means.

3. In an electric heating system, the combination as set forth in claim 1, and also comprising an electric signal device, said second switch device being also operable to energize said signal device upon further heating to a higher temperature following deenergization of said main heating means.

4. In an electric heating system, the combination comprising: main electric heating means; auxiliary electric heating means; a pilot thermostat disposed in heat transfer relation to said main electric heating means so as to be heated principally by heat produced thereby upon energization thereof; a timing thermostat disposed in heat transfer relation to said auxiliary heating means so as to be heated principally thereby upon energization thereof; a normally closed energizing circuit for said main heating means including a pair of normally closed contacts associated with said timing thermostat; a normally open energizing circuit for said auxiliary heating means independent of said normally closed contacts and including a pair of normally open contacts associated with said pilot thermostat; said pilot thermostat being operable, upon heating to a certain elevated temperature, to close said normally open contacts and thereby energize said auxiliary heating means; said timing thermostat being operable, upon heating to a substantially higher temperature after energization of said auxiliary heating means, to open said normally closed contacts and thereby interrupt the energizing circuit of said main heating means while leaving the energizing circuit for said auxiliary heating means closed; and heat conducting means positioned to transfer heat from said auxiliary heating means to said pilot thermostat during energization of said auxiliary heating means after interruption of the energizing circuit of the main heating means, and thereby cause said pilot thermostat to maintain said normally open contacts closed in response to heat received from said auxiliary heating means.

5. In an electric heating system, the combination as set forth in claim 4 and also comprising means for connecting said energizing circuits to a source of electric current and operable to disconnect said energizing circuits from said current source to deenergize said auxiliary heating means while said normally open contacts are closed; said timing thermostat being operable upon cooling, following deenergizing of said auxiliary heating means, to reclose said normally closed contacts in the energizing circuit for said main heating means.

6. In an electric heating system, the combination as set forth in claim 5, in which said pilot thermostat is operable upon cooling, following deenergizing of said auxiliary heating means, to open said normally open contacts in the energizing circuit for said auxiliary heating means.

7. In an electric heating system, the combination as set forth in claim 4, in which the energizing circuit for the main heating means also includes a second pair of normally closed contacts associated with the pilot thermostat, and in which said pilot thermostat is operable, upon heating to a temperature substantially higher than said certain elevated temperature, to open said second pair of normally closed contacts.

8. In an electric heating system, the combination as set forth in claim 4, in which the energizing circuits of both the main and auxiliary heating means include a second pair of normally closed contacts common to both of said circuits and associated with the pilot thermostat, and in which said pilot thermostat is operable, upon heating to a temperature substantially higher than said certain elevated temperature, to open said second pair of normally closed contacts.

9. In combination with a vessel adapted to contain a body of water, an electric heating system for heating said vessel and the water therein, comprising: a main electric heating means in position to heat the vessel and the water therein; auxiliary electric heating means; a first temperature responsive switch device disposed in position to receive heat from said vessel and the water therein and operable, upon heating to a certain elevated temperature below the boiling temperature of water, to energize said auxiliary heating means; and a second temperature responsive switch device disposed in position to be heated by said auxiliary heating means and operable, upon heating to a certain temperature above said boiling temperature after energization of said auxiliary heating means, to deenergize only said main heating means while leaving the auxiliary heating means energized; said auxiliary heating means being positioned to heat said vessel and the water therein following deenergizing of said main heating means.

10. In an electric heating system, the combination comprising: main electric heating means; auxiliary electric heating means; a normally closed energizing circuit for said main heating means; a normally open energizing circuit for said auxiliary heating means; first temperature responsive switch means disposed in heat transfer relation to said main heating means so as to receive heat produced by said main heating means upon energization thereof and operable, upon heating to a certain temperature, to close said normally open energizing circuit and thereby energize said auxiliary heating means; second temperature responsive switch means disposed in heat transfer relation to said auxiliary heating means so as to be heated principally by operation of said auxiliary heating means and operable, upon heating to a certain temperature after energization of said auxiliary heating means, to open said normally closed energizing circuit for the main heating means and thereby deenergize said main heating means while leaving the energizing circuit for the auxiliary heating means closed; and heat conducting means positioned to transfer heat from said auxiliary heating means to said first temperature responsive switch means during energization of said auxiliary heating means while said main heating means is deenergized, and thereby cause said first switch means to maintain the energizing circuit for said auxiliary heating means closed in response to heat received from said auxiliary means.

11. In an electric heating system, the combination as set forth in claim 4, in which the energizing circuit for the main heating means also includes a second pair of normally closed contacts associated with the pilot thermostat; said energizing circuit for the auxiliary heating means being independent of both of said pairs of normally closed contacts in the energizing circuit for the main heating means; and in which said pilot thermostat is operable, upon heating to a temperature higher than said certain elevated temperature, to open said second pair of normally closed contacts and thereby interrupt the energizing circuit of the main heating means while leaving the auxiliary heating means energized.

12. In an electric heating system, the combination comprising: main electric heating means; auxiliary electric heating means; a normally closed energizing circuit for said main heating means; a normally open energizing circuit for said auxiliary heating means; a first temperature responsive switch device disposed in heat transfer relation to said main heating means so as to receive heat produced by said main heating means upon energization thereof and operable, upon heating to a certain temperature, to close said normally open energizing circuit and thereby energize said auxiliary heating means; and a second temperature responsive switch device disposed in heat transfer relation to said auxiliary heating means so as to be heated principally by operation of said auxiliary heating means and operable upon heating to a certain temperature after energiztion of said auxiliary heating means, to open said normally closed energizing circuit and thereby deenergize only said main heating means while leaving the energizing circuit for the auxiliary heating means closed; said first temperature responsive switch device being also disposed in heat transfer relation to said auxiliary heating means so as to receive heat therefrom upon energization thereof and thereby maintain the energizing circuit for the auxiliary heating means closed after the energizing circuit for said main heating means is opened by said second temperature responsive switch device.

13. In an electric heating system, the combination as set forth in claim 12, in which said first temperature responsive switch device is also operable, upon heating to a certain temperature, to open the energizing circuit for said main heating means.

14. In an electric heating system, the combination as set forth in claim 12 and also comprising means for connecting said energizing circuits to a source of electric current and operable to disconnect said energizing circuits from said current source to deenergize said auxiliary heating means while said normally open energizing circuit is closed; said second temperature responsive switch device being operable upon cooling, following deenergizing of said auxiliary heating means, to reclose said normally closed energizing circuit for said main heating means.

15. In an electric heating system, the combination as set forth in claim 14, in which said first temperature responsive switch device is operable upon cooling, following deenergizing of said auxiliary heating means, to open said normally open energizing circuit for said auxiliary heating means.

References Cited in the file of this patent

UNITED STATES PATENTS

| | | |
|---|---|---|
| 2,175,727 | Graham | Oct. 10, 1939 |
| 2,281,319 | Newell | Oct. 28, 1942 |
| 2,427,444 | Colombo | Sept. 16, 1947 |
| 2,504,728 | Purpura | Apr. 18, 1950 |
| 2,526,566 | Kolisch | Oct. 17, 1950 |
| 2,576,432 | Wilcox | Nov. 27, 1951 |
| 2,625,642 | Davis | Jan. 13, 1953 |